Dec. 27, 1932.  F. C. HOLTZ  1,892,552
ALTERNATING CURRENT MOTOR AND METHOD OF CONTROLLING THE SPEED THEREOF
Filed Oct. 1, 1921
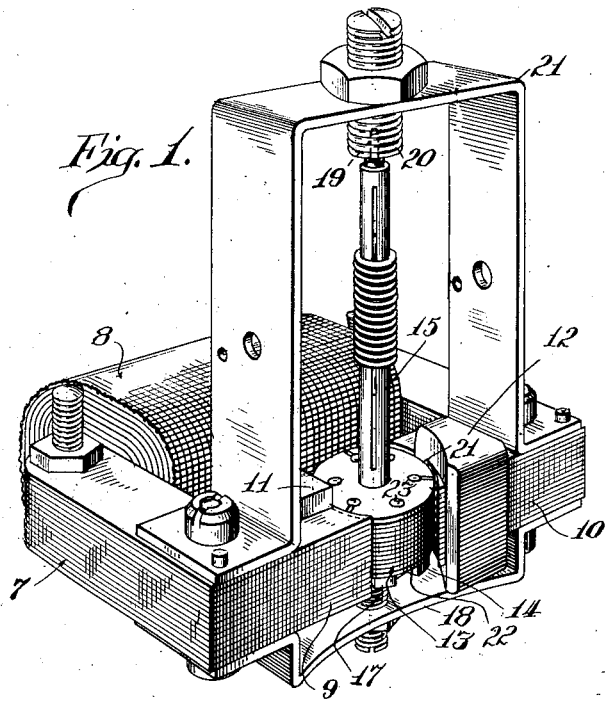
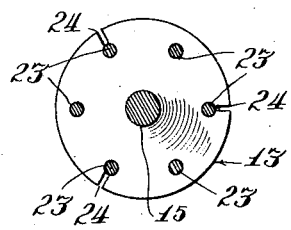
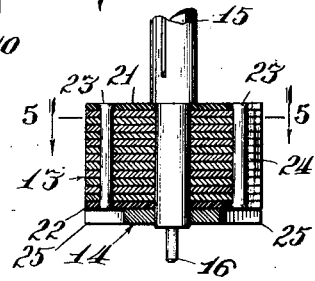
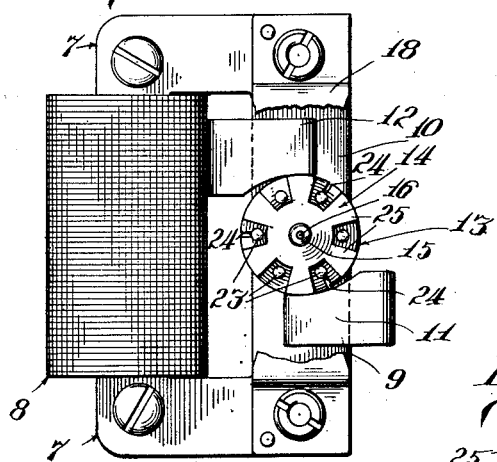
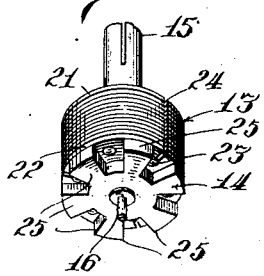
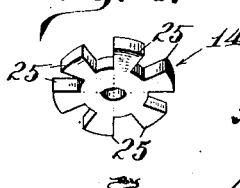

Patented Dec. 27, 1932

1,892,552

UNITED STATES PATENT OFFICE

FREDERICK C. HOLTZ, OF SPRINGFIELD, ILLINOIS, ASSIGNOR TO SANGAMO ELECTRIC COMPANY, OF SPRINGFIELD, ILLINOIS, A CORPORATION OF ILLINOIS

ALTERNATING CURRENT MOTOR AND METHOD OF CONTROLLING THE SPEED THEREOF

Application filed October 1, 1921. Serial No. 504,623.

My invention relates to alternating current motors and has for its object to provide an improved induction motor whose speed will be practically unaffected by varying conditions of load and voltage within wide limits, and will remain constant if the applied frequency of alternations remains constant. To this end it includes not only the improved motor construction hereinafter described and illustrated in the drawing, but also the method by which the desired constant speed under the conditions mentioned is maintained. What I regard as new is particularly set forth in the claims. My invention is applicable to motors of various design and intended for a great variety of uses, but I have chosen to illustrate it as embodied in a small motor intended primarily for use in connection with electrical meters, and such illustration, together with the description thereof, will suffice to make clear the salient or characteristic features of the invention.

Referring to the drawing,

Fig. 1 is a perspective view of the complete motor;

Fig. 2 is a plan view, some parts being broken away;

Fig. 3 is a perspective view of the rotating element, part of the supporting shaft thereof being broken away;

Fig. 4 is a central vertical section of the parts shown in Fig. 3;

Fig. 5 is a horizontal section on line 5—5 of Fig. 4; and

Fig. 6 is a perspective view of the magnetizable steel plate which may form a part of the rotating element considered as a whole.

The greater part of the motor illustrated is of usual construction and comprises a laminated field magnet 7 on which is mounted a coil 8 consisting of a large number of turns and having terminals connected to an alternating current supply. 9, 10 indicate the poles of the field magnet 7, the opposing faces of which are curved so that a cylindrical opening is provided between them in which the armature or rotor rotates. The poles 9, 10 are provided respectively with shading loops 11, 12 mounted on the pole tips, in the manner well-known to those familiar with the art, and serving to create a component of a shifting magnetic field within the cylindrical space between the opposite poles of the field magnet.

The rotor comprises two members, to-wit, an armature 13 of the squirrel cage type, and a hardened steel plate or disc 14 which rotates with the armature. The function of the latter plate 14 will be hereinafter described. Both these members are carried by the same shaft 15, which is mounted so that they occupy the cylindrical space between the poles of the field magnet. In the construction shown the lower end of the shaft 15 is provided with a pin 16 which fits in a suitable socket in a screw-threaded block 17 fitted in a plate 18 attached to the under side of the magnet 7 so as to bridge the poles 9, 10. In like manner the upper end of the shaft 15 is provided with a pivot pin 19 which fits in a screw-threaded block 20 fitted in a yoke 21, which is secured to the upper surface of the field magnet 7 and also bridges the poles 9, 10.

As best shown in Fig. 4, the armature 13 is of laminated construction, being composed of a number of sheet iron plates disposed between copper plates 21, 22, which are secured together by copper rods 23 which extend through holes in said sheet iron plates. The periphery of the rotor may, if desired, be provided with slots 24 opposite certain of the rods or bars 23 in accordance with the usual practice, as shown in Figs. 4 and 5.

As best shown in Fig. 6, the steel plate or disc 14 has its periphery notched to form a plurality of projecting poles 25, the outer surfaces of which coincide with the periphery of the armature, and this plate is fitted upon the shaft 15 adjacent to the armature and rotates therewith. In the drawing the shaft 15 is shown as being provided with a worm for connecting it with the mechanism to be driven by the motor, but any other suitable power transmitting device may be employed.

From the foregoing description it will be understood that except for the steel plate 14 the motor described is nothing more than a small induction motor whose speed at constant voltage and frequency will vary with the nature of the mechanical load, and that when the armature is rotating freely in its bearings without delivering any mechanical load it will have a speed which will depend somewhat upon the design of the pole faces of the field magnet. The highest theoretical speed would be one revolution for each cycle of the alternating current supplied, but the torque characteristics as well as the maximum speed which the motor will attain can readily be controlled by design, as by slotting the rotor in the manner illustrated in the drawing.

In the embodiment shown the steel disc has six projecting pole pieces and as clearly represented in Figs. 2 and 3, the slots in the steel disc may be and preferably are aligned up with the holes and slots in the rotor laminations. In the embodiment described the arrangement gives the magnetic circuit of the rotor as a whole the effect of having six salient poles and gives the motor a pronounced reaction characteristic at a speed corresponding to that of a six pole synchronous motor. Thus, if we assume a 60 cycle source of supply the motor described will have pronounced reaction characteristics at 1200 R. P. M. which is considerably below the speed at which the squirrel cage element will tend to rotate. I have found that by proportioning the parts of a 60 cycle motor substantially as illustrated in the drawing, the reaction characteristic will predominate over the induction motor characteristic and, due to the reaction characteristic, the motor will operate at a true synchronous speed, in the case assumed at 1200 R. P. M. At this speed the squirrel cage is still active to produce considerable torque since its theoretical synchronous speed is 3600 R. P. M. and this squirrel cage torque is absorbed at light loads in attempting to carry the rotor above 1200 R. P. M. From what has been said it will be evident that, if now, a mechanical load be applied to the armature shaft the maximum load which may be carried without a change in speed from 1200 R. P. M. will be represented by the sum of the torque which the induction element of the rotor had upon reaching this synchronous speed plus the torque which the reaction element of the rotor will exert before being pulled out of synchronism. It is clear that such a reaction motor without the squirrel cage or some equivalent induction motor action would not start from rest. Thus, the main function of the squirrel cage is to bring the rotor up to this synchronous speed of 1200 R. P. M. and thereafter the squirrel cage torque is available as driving torque for motor loads above that which would otherwise pull the rotor out of step.

Upon reaching the speed of 1200 R. P. M. in the case assumed, the magnetic circuit of the rotor may be considered as substantially aligning itself up so as to present a path of minimum reluctance to an alternating flux impulse which is being shifted across the stator pole faces at one instant and during the reversal of the flux the rotor makes 1/6 of a revolution so as to present the next succeeding path of minimum reluctance to the reversed flux impulse at the next instant. Thus, for each complete cycle of flux change the rotor will move through 1/3 of a revolution which will bring every other magnetic rotor pole opposite a given stator pole face when the flux impulse therethrough is in one direction and will bring the other group of alternate rotor poles opposite the same pole face when the flux therethrough is in the opposite direction. Due to this fact it is probable that the alternate poles of the steel disc may become more or less permanently magnetized as alternate north and south poles which will be helpful but not essential to the operation. From the foregoing discussion there may be deduced what I consider to be a general characteristic of the reactance type of motor, namely, that the motor will have a true synchronous speed corresponding to that which causes the reactance of the motor to pulsate at twice the frequency of the alternating current supply.

While I do not consider the phase shifting feature as essential to the reaction characteristic of the motor, it, or some equivalent arrangement, is essential to cause the induction motor element to start from rest. The critical relation between the flux impulses and the magnetic circuits formed by the rotor at 1200 R. P. M., in the example given, do not exist, or at least not to the same extent, at speeds below 1200 R. P. M. Furthermore the squirrel cage action at lower speeds is stronger than it is at 1200 R. P. M. Consequently the reaction characteristic does not prevent the rotor from starting and coming up to this synchronous speed by induction motor action. However, at this critical speed the reaction characteristic becomes pronounced and predominates over the induction motor characteristic and prevents any further increase in speed although it will be evident that considerable squirrel cage action still exists.

The above explanation is not intended to be a complete exposition of the electrical phenomenon involved in the motor, but only as one way of explaining why the speed of the motor is limited to a synchronous speed below that corresponding to the free running speed of the induction element of the motor, and although I believe the explanation above given to be the correct one in its general scope I, of course, do not wish to be bound by any particular theory of operation.

I am aware that it has heretofore been proposed to provide a reaction motor with a greater number of rotor poles than stator poles so that the motor will operate at a true synchronous speed corresponding to the greater number of poles. Such an arrangement is described in Coerper Patent #527,195. I am also aware that it is old to provide a reaction motor with induction motor starting means where the reaction motor and induction motor elements are arranged for the same synchronous speed corresponding to that of the stator pole number. For example, as is described in Warren Patent #1,283,432.

However, I believe I am the first to provide an induction reaction motor where the rotor operates at a true synchronous speed below that corresponding to the maximum theoretical induction motor speed so as to obtain the advantage of the induction motor action for both starting and synchronous operation.

While I have illustrated the rotating disc 14 as being provided with six poles 25, my invention is not limited to that construction or to the use of the specific armature shown and described as various arrangements or modifications may be employed. So far as I am aware, I am the first in the art to provide for maintaining the speed of an alternating current motor having an induction rotor approximately constant under a constant frequency of alternations of the alternating current supply by magnetically interposing resistance to the attainment by said rotor of its free running speed, and therefore, this mode of operation as well as the apparatus by which it may be practiced are claimed generically as my invention.

Some of the features of my invention may be restated as following: The stator element shown in the drawing has salient poles split into halves forming polar projections. A shading coil is provided on certain of the polar projections, which dephases the flux in one portion of each pole. The flux thus produced by the stator may be considered as being divided into a rotating or a shifting field component and a strongly pulsating field component. The secondary illustrated comprises two portions, namely, an induction motor secondary forming a plurality of short-circuited paths cooperating with and responsive to the rotating or shifting component of the flux to produce starting and accelerating torque and a slotted magnetic portion producing the effect of salient poles in excess of the number of poles of the stator; the open slots in the magnetic end plate 14 are preferably in alignment with the open and closed slots containing the squirrel cage bars 23 as illustrated. The teeth between the slots give a salient pole effect which cooperates with and responds to the pulsating flux component to produce a predominating synchronous torque at a speed preferably below the speed where the accelerating torque diminishes to zero.

The distance between the center lines of the portions of the split stator poles may be considered as being so related to the amount of dephasing of the flux and the synchronous speed at which the motor is designed to operate that the salient poles of the secondary are successively attracted at substantially the proper times by the respective portions of the split poles as to come under each of the pole halves of the field member as the alternating flux therein approaches a maximum value in either direction and thus lock into step with the pulsating flux component.

What I claim as my invention and desire to secure by Letters Patent is:

1. An alternating current motor provided with a field member for producing a strongly pulsating, shifting magnetic field and a rotatable secondary member arranged to be influenced by said field, said secondary member having a short-circuited winding thereon and a magnetic circuit designed to have polar effects and proportioned to oppose and overcome the torque produced by said short-circuited winding at a definite synchronous speed below that corresponding to full synchronism.

2. An induction reaction motor comprising relatively rotatable cooperating primary and secondary members, said primary member comprising means for producing a strongly pulsating, shifting magnetic field and said secondary member being designed to give both reaction and induction motor characteristics, characterized by an arrangement such that the reaction characteristic predominates over the induction characteristic at a definite synchronous speed which is materially below the full theoretical synchronous induction motor speed.

3. An induction reaction motor comprising relatively rotatable cooperating primary and secondary members, said primary member comprising means for producing a strongly pulsating, shifting magnetic field and said secondary member being designed to give both reaction and induction motor characteristics, characterized by an arrangement such that the reaction characteristic predominates over the induction motor characteristic at a definite synchronous speed, at which speed the torque due to the induction motor characteristic is of appreciable magnitude.

4. A self-starting synchronous motor comprising cooperating stator and rotor elements, means associated with said stator element for producing a strongly pulsating, shifting magnetic field through said rotor element, a short-circuited current path on said rotor element for producing induction motor action, and a magnetic circuit on said rotor element designed to give the rotor a predominating reactance characteristic at an operating speed where considerable induction motor action exists.

5. A self-starting synchronous motor comprising a bi-polar shifting field stator member and a squirrel cage induction motor rotor member, said rotor member having a magnetic circuit designed to produce a predominating reaction motor characteristic at a definite synchronous speed materially below that corresponding to the theoretical synchronous speed of the squirrel cage.

6. A self starting synchronous motor having cooperating relatively rotatable primary and secondary members, said primary member being designed to produce a polar shifting magnetic field and said secondary member being designed with magnetic poles greater in number than the poles of the primary member and with a short circuited secondary winding, said motor being so designed and proportioned as to be self starting and simultaneously produce a predominating reaction motor torque and a less induction motor torque at an operating speed materially below that at which the induction motor torque becomes nil.

7. In an alternating current motor, the combination with a stator having means for producing a strongly pulsating, shifting magnetic field, of a rotor provided with a squirrel cage winding and having a magnetic circuit designed to magnetically interpose resistance to, and thereby prevent, the attainment by said rotor of its free running speed.

8. In combination with a source of alternating current supply, an alternating current motor comprising cooperating relatively rotatable primary and secondary members, said primary member comprising means for producing a strongly pulsating, shifting magnetic field and said secondary member having a squirrel cage winding and a magnetic circuit designed to have a greater number of magnetic poles than the primary member, such that, at a speed below the theoretical induction motor synchronous speed, the reactance of the motor is caused to pulsate at twice the frequency of the alternating current supply to such an extent as to hold the rotative element of the motor at this speed against the action of the squirrel cage torque tending to cause rotation above this speed.

9. A self-starting synchronous motor comprising cooperating stator and rotor elements, said stator element comprising means for producing a strongly pulsating, shifting magnetic field and said rotor elements comprising a squirrel cage secondary of usual construction together with a disc of magnetic material arranged concentric with the rotor, said disc having evenly spaced prominent teeth greater in number than the poles of the stator arranged substantially flush with the rotor periphery within the influence of the stator member, the resultant magnetic effect of such arrangement being to cause the reactance of the motor to pulsate at twice the frequency of the source of supply at a speed materially less than the theoretical synchronous speed of the squirrel cage to such an extent that the operating speed of the motor is limited by such pulsations.

10. A self-starting synchronous motor comprising a primary stator member and a cooperating rotor secondary member, said primary member comprising means for producing a strongly pulsating, shifting magnetic field and said secondary member comprising a squirrel cage element of usual construction together with a disc of magnetic material arranged at one end of the rotor, said disc having evenly spaced slots and teeth, the number of slots therein being equal to the number of the squirrel cage bars and spaced substantially in alignment therewith, said arrangement causing the rotor to have a predominating reaction characteristic at a speed materially below that corresponding to the theoretical synchronous speed of the squirrel cage.

11. A self-starting, single-phase synchronous motor comprising a field member having split salient poles and means for dephasing the flux in one portion of each pole, whereby a rotating component field is established for starting purposes, and a relatively rotating member having a conducting portion providing a plurality of short-circuited paths for operating on the induction-motor principle and having magnetizable material forming a salient-pole construction, the salient poles of the field member and of the relatively rotating member being so related that the motor is caused to lock into synchronism at a speed less than the normal induction-motor speed.

12. A self-starting, single-phase synchronous motor comprising a field member having split salient poles and means for dephasing the flux in one portion of each pole, whereby a rotating component field is established for starting purposes, and a relatively rotating member having a conducting portion providing a plurality of short-circuited paths for operating on the induction-motor principle and having magnetizable material forming a salient-pole construction, the number of salient poles of the relatively rotating member being greater than the number of poles of the rotating component field.

13. A self-starting, single-phase synchronous motor comprising a field member having split salient poles and means for dephasing the flux in one portion of each pole, whereby a rotating component field is established for starting purposes, and a relatively rotating member having a conducting portion providing a plurality of short-circuited paths for operating on the induction-motor principle and having magnetizable material forming a salient-pole construction, the distances between the center lines of the portions of the split poles being so related to the amount of dephasing of the flux and the synchronous speed at which the motor is designed to operate that the salient poles of the relatively rotating member are successively attracted, at substantially the proper times, by the respective portions of the split poles, to cause the motor to operate at a fixed speed less than the speed corresponding to the number of poles on the field member.

14. A self-starting, single-phase synchronous motor comprising a field member having split salient poles and means for dephasing the flux in one portion of each pole, whereby a rotating component field is established for starting purposes, and a relatively rotating member having a conducting portion providing a plurality of short-circuited paths for operating on the induction-motor principle and having magnetizable material forming a salient-pole construction, the number of salient poles of the relatively rotating member being greater than the number of poles of the rotating component field, the distances between the center lines of the portions of the split poles being so related to the amount of dephasing of the flux and the synchronous speed at which the motor is designed to operate that the salient poles of the relatively rotating member are successively attracted, at substantially the proper times, by the respective portions of the split poles.

15. A self-starting, single-phase synchronous motor comprising a field member having split salient poles and a shading coil on one portion of each pole, and an open-slot, squirrel cage secondary member cooperating therewith in such manner that the teeth between the slots cooperate with the portions of the split poles to cause the motor to operate, under normal load conditions, at a synchronous speed less than the induction-motor speed.

16. An alternating-current motor comprising a field member having salient poles, each of said poles being split into two halves, means for causing the alternating magnetic field in one of the halves of each pole to lag behind the other, and an armature having characteristics producing the effect of a plurality of salient poles, the number of armature poles being a multiple of the number of field poles, the width and relative spacing of the pole halves and the amount of dephasing of the magnetic fields therein being so proportioned, in relation to the number of armature poles, that, when the motor is operating at a synchronous speed corresponding to the number of armature poles, an armature pole will come under each of the pole halves of the field member as the alternating flux therein approaches a maximum value in either direction.

17. An alternating-current motor comprising an armature member having characteristics producing the effect of a relatively large number of salient poles, means on said armature for causing the same to operate as the secondary member of an induction motor, and an inducing member for producing rotation of said armature member, said inducing member having a smaller number of poles than said armature member, each of the poles on the inducing member being split into two halves, and means for causing the alternating magnetic field in one of the halves of each pole to lag behind the other, the width and relative spacing of the pole halves and the amount of de-phasing of the magnetic fields therein being so proportioned, in relation to the number of armature poles, that, when the motor is operating at a synchronous speed corresponding to the number of armature poles, an armature pole will come under each of the pole halves of the inducing member as the alternating flux therein approaches a maximum value in either direction.

18. A self-starting alternating-current motor comprising a field member having salient polar members having axially extending splits, therein, means for producing a rotating magnetic field in said field member, and an armature mounted for rotation relative to said field member, said armature comprising means constituting an induction-motor secondary member tending to accelerate said motor almost to full synchronous speed corresponding to the number of salient polar members of said field member, and means constituting a salient-pole, synchronous motor member having a relatively large number of salient poles adapted to lock into step with respect to the split portions of said field polar members at a definite sub-synchronous speed.

19. In a motor, the combination with means for producing a rotating magnetic field having a pulsating flux component, of a composite armature comprising a non-magnetic element effective to operate the armature as an induction-motor armature and a plurality of magnetic elements effective to operate the armature in predetermined sub-synchronous relation to the field.

20. A self-starting, single-phase motor comprising a bi-polar field member, each pole piece thereof being split longitudinally and having a shading coil on one of the split portions, a single-phase coil for magnetizing said field member, and a composite armature comprising a portion including a non-magnetic element effective to produce torque as an induction-motor armature and a portion including a plurality of magnetic elements effective to lock into step with respect to the split portions of said field pole pieces at a definite sub-synchronous speed.

21. A self-starting single-phase motor comprising a bi-polar field member, each pole piece thereof being split longitudinally and having a shading coil on one of the split portions, a single-phase coil for magnetizing said field member, and an armature mounted for rotation relative to said field member, said armature comprising means constituting an induction-motor secondary member tending to accelerate said motor almost to full bi-polar synchronous speed, and means constituting a salient pole synchronous-motor member having a relatively large number of salient poles adapted to lock into step with respect to the split portions of said field pole pieces at a definite sub-synchronous speed.

22. An induction reaction motor having a salient pole primary member and a salient pole secondary member, an induction motor secondary winding on said secondary member, the salient poles of said secondary member constituting a reaction motor secondary having a greater number of poles than the primary member, said secondary member being so designed that the reaction motor torque at the synchronous speed corresponding to the pole number of the secondary is in excess of the induction motor torque at said speed, whereby said motor is capable of simultaneously operating as an induction motor and a reaction motor at a synchronous speed corresponding to the number of poles of the reaction motor secondary.

23. An alternating current motor having a single winding, shaded pole, primary member and a squirrel cage secondary member, the magnetic circuit of which forms salient magnetic poles in excess of the pole number of the primary member, said motor having a reaction torque due to said salient poles which is in excess of the induction motor torque at a speed corresponding to the said salient pole number, and an induction motor starting torque in excess of the tendency of the salient poles to lock the motor at standstill whereby said motor is enabled to start as an induction motor and to run under load at such speed as a combined induction and reaction motor.

24. A self-starting alternating current synchronous motor comprising a rotor consisting of a shaft, a self-starting secondary motor element, and a synchronous secondary motor element located side by side on said shaft, and stator means for simultaneously producing an alternating shifting magnetic field in the self-starting secondary element, and an alternating pulsating magnetic field of the same frequency in the synchronous secondary element, said secondary elements having characteristics such that when so energized by the stator fluxes the starting element produces a predominating torque at stand-still and below synchronous speed and an accelerating tendency at the latter speed, and the synchronous secondary element producing a locking tendency at stand-still and a predominating synchronous torque at the synchronous speed.

25. A self-starting synchronous motor comprising primary stator means for producing a rotating field component of flux and a pulsating field component of flux, a rotor having parts influenced by the stator fluxes, said rotor comprising an induction motor secondary part cooperating with the rotating field flux component for starting the motor, and a salient pole magnetic part axially displaced with respect to the induction motor secondary part cooperating with the pulsating flux field component to produce synchronous operation, the number of salient poles in said magnetic part being such as to produce synchronous operation of the motor at a speed below the theoretical free running speed of the induction motor secondary part.

26. A self-starting alternating current synchronous motor comprising a single phase stator for producing a flux having a shifting field component and a pulsating field component, rotary secondary means within the influence of said flux, said secondary means including a salient pole reaction motor secondary element responsive to the pulsating component of said flux to produce operation at a definite synchronous speed, and a torque producing secondary element responsive to the shifting component of said flux for starting and accelerating the secondary, the latter element having a torque tending to accelerate the secondary above the said synchronous speed, which torque is less than the synchronous torque at such speed, said two secondary elements being differently located within the influence of the stator flux, but both having the same axis of rotation.

27. A self-starting synchronous motor comprising a single phase shaded pole primary field element for producing fluxes having a shifting component and a pulsating component, a rotor within the influence of said fluxes, said rotor having starting and accelerating torque producing means responsive to the shifting flux component to cause the motor to be self-starting, and having salient magnetic poles responsive to the pulsating flux component to produce synchronous operation at a definite synchronous speed below that at which the accelerating torque becomes nil.

28. A self-starting synchronous motor comprising relatively rotatable primary and secondary parts, the primary comprising electromagnetic means energized by a single phase coil for simultaneously producing a pulsating component of flux and a shifting component of flux, the secondary part having means influenced by the pulsating component of flux for producing a synchronous torque at the desired synchronous operating speed, and means influenced by the shifting component of flux for producing a starting and accelerating torque at all speeds below and including the desired synchronous operating speed, the accelerating torque at the synchronous operating speed being less than the synchronous torque at said speed.

FREDERICK C. HOLTZ.